United States Patent
Feeser

(10) Patent No.: US 10,007,506 B1
(45) Date of Patent: *Jun. 26, 2018

(54) WORKSTATION UPTIME, MAINTENANCE, AND REBOOT SERVICE

(71) Applicant: OPEN INVENTION NETWORK LLC, Durham, NC (US)

(72) Inventor: Colin Feeser, Atlanta, GA (US)

(73) Assignee: Open Invention Network, LLC, Durham, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/647,135

(22) Filed: Jul. 11, 2017

Related U.S. Application Data

(63) Continuation of application No. 14/861,401, filed on Sep. 22, 2015, now Pat. No. 9,703,544, which is a continuation of application No. 13/963,156, filed on Aug. 9, 2013, now Pat. No. 9,141,371, which is a continuation of application No. 11/402,094, filed on Apr. 11, 2006, now Pat. No. 8,533,700.

(51) Int. Cl.
　　*G06F 9/44* (2018.01)
　　*G06F 8/65* (2018.01)
　　*G06F 9/4401* (2018.01)
　　*G06F 8/61* (2018.01)

(52) U.S. Cl.
　　CPC .............. *G06F 8/65* (2013.01); *G06F 8/61* (2013.01); *G06F 9/4401* (2013.01)

(58) Field of Classification Search
　　None
　　See application file for complete search history.

(56) References Cited

U.S. PATENT DOCUMENTS

| | | | | |
|---|---|---|---|---|
| 6,167,567 A * | 12/2000 | Chiles | ....................... | G06F 8/65 709/221 |
| 6,199,204 B1 * | 3/2001 | Donohue | .................. | G06F 8/65 705/59 |
| 6,202,207 B1 * | 3/2001 | Donohue | .................. | G06F 8/65 705/59 |
| 6,718,549 B1 * | 4/2004 | Narin | ........................ | G06F 8/65 709/203 |
| 7,389,504 B2 * | 6/2008 | Kawano | .................... | G06F 8/65 717/168 |

(Continued)

*Primary Examiner* — Hiren Patel
(74) *Attorney, Agent, or Firm* — Haynes and Boone, LLP

(57) ABSTRACT

Managing updates to executable programming code on a computer system in a computer network. A maintenance service utility is configured to launch a maintenance procedure at a specified time during operation of the computer system. Operation of a maintenance timer utility is activated during startup of the computer system to track and monitor the amount of time the computer system has been operating since startup. The maintenance service utility determines if there any updates to the executable programming code that require installation. The maintenance procedure is launched after a specified time if there are updates to the executable programming code. The computer system is automatically rebooted to install the updates to the executable programming code. A maintenance service editor utility enables the maintenance service utility to be configured to launch the maintenance procedure after a specified time if there are updates to the executable programming code.

26 Claims, 15 Drawing Sheets

(56) References Cited

U.S. PATENT DOCUMENTS

| | | | | |
|---|---|---|---|---|
| 7,546,595 B1* | 6/2009 | Wickham | ............... | G06F 8/65 |
| | | | | 717/168 |
| 7,818,734 B2* | 10/2010 | Giannini | ............... | G06F 8/65 |
| | | | | 717/168 |
| 7,966,665 B1* | 6/2011 | Feeser | ............... | G06F 21/57 |
| | | | | 726/1 |
| 8,065,673 B2* | 11/2011 | D'Souza | ............... | G06F 9/485 |
| | | | | 709/203 |
| 8,533,700 B1* | 9/2013 | Feeser | ............... | G06F 8/60 |
| | | | | 717/168 |
| 9,141,371 B1* | 9/2015 | Feeser | ............... | G06F 8/60 |
| 9,703,544 B1* | 7/2017 | Feeser | ............... | G06F 8/65 |
| 9,843,586 B1* | 12/2017 | Feeser | ............... | H04L 63/10 |
| 2003/0074658 A1* | 4/2003 | Kim | ............... | G06F 8/65 |
| | | | | 717/168 |
| 2003/0233648 A1* | 12/2003 | Earl | ............... | G06F 8/65 |
| | | | | 717/176 |
| 2004/0093597 A1* | 5/2004 | Rao | ............... | G06F 8/65 |
| | | | | 717/171 |
| 2004/0187103 A1* | 9/2004 | Wickham | ............... | G06F 8/65 |
| | | | | 717/168 |
| 2005/0210459 A1* | 9/2005 | Henderson | ............... | G06F 8/65 |
| | | | | 717/168 |
| 2005/0262076 A1* | 11/2005 | Voskuil | ............... | G06F 8/65 |
| 2006/0080656 A1* | 4/2006 | Cain | ............... | G06F 8/65 |
| | | | | 717/174 |
| 2006/0212865 A1* | 9/2006 | Vincent | ............... | G06F 8/65 |
| | | | | 717/168 |

* cited by examiner

WinUp Time: In Exception Group?

CLFEESERO is NOT in the ADM WorkstationRebootException group.
It WILL be rebooted in the force reboot parameter.

THIS COMPUTER NEEDS REBOOTING!!!

Your computer has been up for longer than is reccomended.

Many of the problems reported to the IT Help Desk are caused by computers that are not rebooted regularly.

Please take a moment and reboot your workstation.

Clicking the YES button below will automatically reboot your workstation.
--Please save your work before clicking this button --

Clicking the NO button will not reboot at this time, however, you will be asked to reboot again very soon.

Thank you for your cooperation and attention.

This machine will automatically reboot on Mon. April 3 16:50:58 2006

[ YES ]   [ NO ]

FIG. 2D

SERVICES

| FILE | ACTION | VIEW | HELP |

SERVICES (LOCAL)

| Name | Description | Status | Startup Type | Log On As |
|---|---|---|---|---|
| Remote Procedure Call (RPC) | Provides the endpoint mapper and other miscellaneous | Started | Automatic | Local System |
| Remote Procedure Call (RPC) Locator | Manages the RPC name service database | | Manual | Network |
| Remote Registry | Enables remote users to modify registry settings on ... | Started | Automatic | Local System |
| Remote Task Manager | | Started | Manual | Local System |
| Removable Storage | | Started | Manual | Local System |
| Routing and Remote Access | Offers routing services to businesses in local area an... | Started | Disabled | Local System |
| SavRoam | Symantec AntiVirus Roaming Service | Started | Automatic | Local System |
| Secondary Logon | Enables starting in processes under alternate credential... | Started | Automatic | Local System |
| Security Accounts Manager | Stores security information for local user accounts | Started | Automatic | Local System |
| Server | Supports file, print, and named-pipe sharing over the ... | Started | Automatic | Local System |
| SES WebIcons Installer Service | SES WebIcons Installer Service | Started | Automatic | Local System |
| SES WebIcons Notification Service | SES WebIcons Notification Service | Started | Automatic | Local System |
| SES WebIcons Workstation Service | SES WebIcons Workstation Service | Started | Automatic | Local System |
| SES Windows Maintenance Service | Workstation Maintenance Service | Started | Automatic | Local System |
| Shell Hardware Detection | | Started | Automatic | Local System |
| Smart Card | Manages access to smart cards read by this computer... | Started | Manual | Local System |
| Smart Card Helper | Enables support for legacy non-plug and play smart-c... | Started | Manual | Local System |
| SMS Agent Host | Provides change and configuration services for comp... | Started | Automatic | Local System |

EXTENDED / STANDARD

WORKSTATION UPTIME, MAINTENANCE, AND REBOOT SERVICE

CROSS-REFERENCE TO RELATED APPLICATIONS

This application is a continuation from U.S. patent application Ser. No. 14/861,401, filed Sep. 22, 2015, entitled WORKSTATION UPTIME, MAINTENANCE, AND REBOOT SERVICE, now issued U.S. Pat. No. 9,703,544, issued on Jul. 11, 2017, which is a continuation from U.S. patent application Ser. No. 13/963,156, filed Aug. 9, 2013, entitled WORKSTATION UPTIME, MAINTENANCE, AND REBOOT SERVICE, now issued U.S. Pat. No. 9,141,371, issued on Sep. 22, 2015, which is a continuation of U.S. patent application Ser. No. 11/402,094, filed Apr. 11, 2006, and entitled WORKSTATION UPTIME, MAINTENANCE, AND REBOOT SERVICE, now issued U.S. Pat. No. 8,533,700, issued on Sep. 10, 2013, incorporated by reference herein in their entirety.

BACKGROUND OF THE INVENTION

The present invention relates generally to management of client workstations in a large wide area computer network and, more particularly, to monitoring of client workstations to keep workstations current with operating system and antivirus software updates.

A large enterprise will typically have a wide area network (WAN) with many thousands of workstations that are connected to various servers in the network. Managing operating system updates to combat computer viruses in this environment is very problematic since large numbers of these workstations are desktop computers that are left running when the employees that use them leave work. The employees simply log back in the following work day and the desktop does not get rebooted on a regular basis. Regularly restarting a computer activates program updates and software patches that protect personal computers and the network form viruses. Problems with computer memory and applications locking up also can be attributable to failure to reboot a computer on a regular basis.

The traditional approach to the problem has been to educate employees to reboot their workstations on a daily basis, but this approach has had limited success in many large enterprises.

Thus, there is a need for an automated approach to workstation update and maintenance to solve the maintenance and virus proliferation problems on an enterprise wide area network caused by a lack of regular workstation reboots, and that does not require the cooperation of individual computer users. There is significant business value in the avoidance of Information Technology (IT) support center phone calls and desktop support staff visits caused by failure to have the operating system updates and other software patches installed on a timely basis.

SUMMARY OF THE INVENTION

The present invention is directed to an automated method for managing computer system updates and maintenance in an enterprise computer wide area network. The automated solution provides basic reboot functionality, the ability to configure and manage workstations on a large network, the ability to centrally manage exceptions, and the ability to warn users before the actual computer reboot occurs.

The invention is implemented in several software tools that work together to monitor individual workstations on the wide area network and reboot the workstations when needed for proper maintenance. A workstation uptime utility measures the amount of time that a workstation has been running without reboot. A workstation maintenance utility triggers the workstation reboot if the time without reboot exceeds a pre-set threshold.

The purpose of the workstation maintenance utility is to provide a service which will launch maintenance procedures at desired intervals on a workstation or server. In an exemplary embodiment, the workstation maintenance utility has five different possible methods for launching a maintenance procedure: (1) after one hour of workstation startup and every hour after; (2) after every specified wait period; (3) on a particular day of the week and hour; (4) on a particular date and hour; and (5) on a daily basis during a specified hour.

In one aspect of the invention, a method is provided for managing updates to executable programming code on a computer system in a computer network. A maintenance service utility is configured to launch a maintenance procedure at a specified time during operation of the computer system. A maintenance timer is activated during start up of the computer system to track the amount of time that the computer system has been operating since start up, without rebooting. The maintenance service utility determines if there are any updates to the executable programming code that require installation. If there are updates to the executable programming code, the maintenance service utility launches the maintenance procedure after a specified time. The computer system is automatically rebooted to install the updates to the executable programming code.

In another aspect of the invention, a system is provided for managing updates to executable programming code on a computer system in a computer network. The system includes a maintenance uptime component that is activated during startup of the computer system to track the amount of time that the computer system has been operating since startup. The system also includes a maintenance service component, cooperative with the maintenance uptime component, for determining if there are any updates to the executable programming code that require installation and launching a predefined maintenance procedure at a specified time during operation of the computer system. The maintenance service component automatically reboots the computer system to install updates to the executable programming code. The system further includes a maintenance service editor component for configuring the maintenance service component to launch the predefined maintenance procedure after a specified time if there are updates to the executable code.

In yet another aspect of the invention, a computer program product is provided for managing updates to executable programming code on a computer system in a computer network. The computer program product includes a computer readable medium having computer readable code embedded therein. The computer readable medium includes: program instructions that configure a maintenance service utility to launch a maintenance procedure at a specified time during operation of the computer system; program instructions that activate operation of a maintenance timer utility during startup of the computer system to track an amount of time that the computer system has been operating since startup; program instructions that determine if there are any updates to the executable programming code that require installation; program instructions that launch the maintenance procedure after a specified time if there are updates to the executable programming code; and program instructions that automatically reboot the computer system to install the updates to the executable programming code.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIGS. 2A-2E illustrate various exemplary screen displays generated by the workstation uptime utility.

FIG. 3 illustrates an exemplary Service Control Manager view with the workstation maintenance utility service selected.

DETAILED DESCRIPTION OF THE INVENTION

Figure 1:
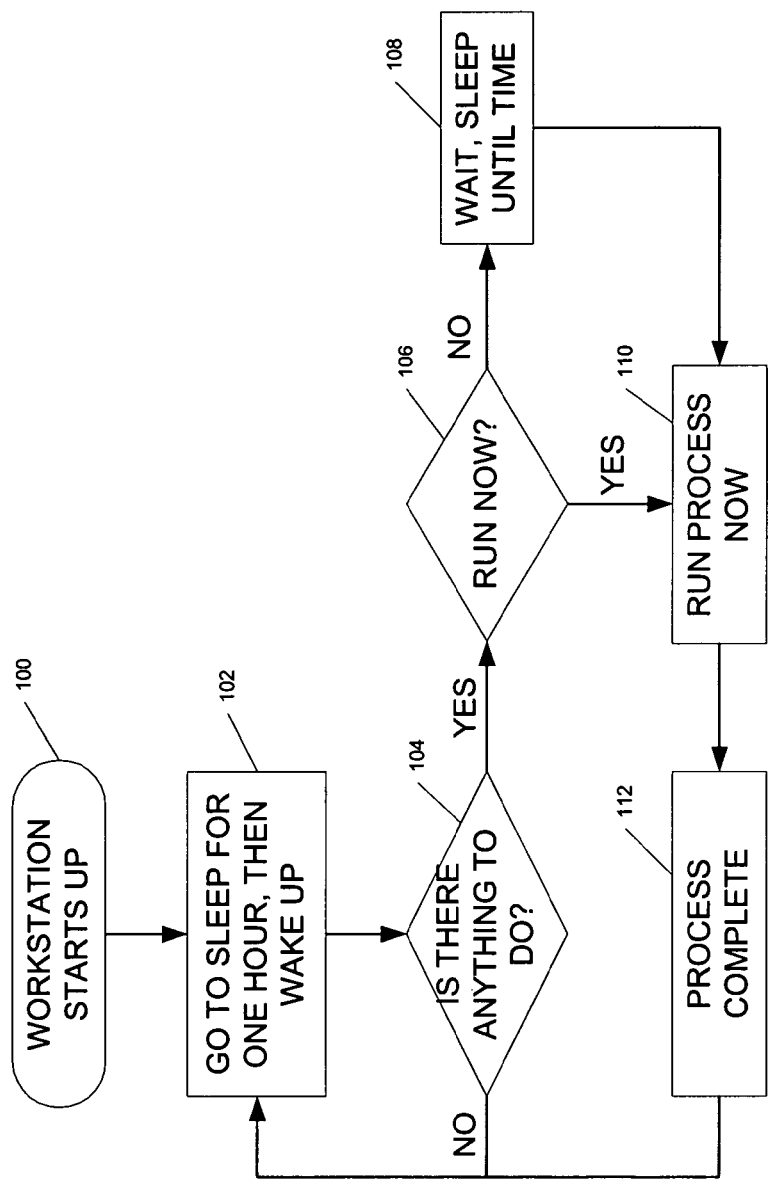
FIG. 1 illustrates processing logic for the workstation maintenance utility in accordance with an exemplary embodiment of the invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The invention is implemented in several software tools that work together to monitor individual workstations on a wide area network and reboot the workstations when needed for proper maintenance. A workstation uptime utility measures the amount of time that a workstation has been running without reboot. A workstation maintenance utility triggers the workstation reboot if the time without reboot exceeds a pre-set threshold. The workstation maintenance utility has the ability to be configured to launch a maintenance application at a specified time after the startup of the workstation. In the context of the invention, workstation is defined to encompass desktop computer, laptop computer, server computer, client computer, handheld devices and any other computing devices that are connected to, or have access to, the wide area network.

Workstation Maintenance Utility

The workstation maintenance utility is a service that enables configuration of a large number of workstations to run specific processes at a scheduled time without every workstation running specific processes at the same time. The workstation maintenance utility can be managed remotely. The time that a workstation is set to run is relative to the startup time of the service or workstation. Since every workstation will have a different startup time, the time the processes are scheduled to run will be at random intervals preventing the potential problem of network overload.

The workstation maintenance utility is installed using a standard installation program such as Microsoft Windows Installer for workstations operating on the Microsoft Windows platform. The command line for workstation maintenance utility can also install and uninstall the service. Once installed as a service, the workstation maintenance utility will check every hour to see if it has anything assigned for it to do. If the workstation maintenance utility has nothing that is ready to be run, it simply goes back to sleep for another hour.

The workstation maintenance utility is command line executable. In an exemplary embodiment in a Windows platform environment, typing WinMaint -? at the command line will display the following message:

SYNTAX:
WinMaint [-i] [-u] [-?]
-i—Install WinMaint as a service.
-u—Uninstall WinMaint as a service.
-?—This help screen.

The workstation maintenance utility component of the invention can be configured to operate in several ways. In an exemplary embodiment, when the service or workstation is started, the workstation maintenance utility sleeps for one hour before it wakes up and checks if it has any tasks to perform.

There are several possible methods that the workstation maintenance utility can use to determine if a process is ready to be launched. These methods include, but are not limited to, the following:

1. launch the service after the first hour since boot up, and every hour thereafter at the same minute;
2. launch the service after a specified amount of wait time, specified in milliseconds;
3. launch the service on every occasion of a specified day of the week and at a local time zone hour;
4. launch only on a specified date and at a local time zone hour;
5. launch every day during a specified local time zone hour.

The workstation maintenance utility deals in increments of hours in an exemplary embodiment. The minute of launch is determined by the time (i.e., minute) that the workstation or service started up, thereby providing random launch capabilities. When the workstation boots up and the workstation maintenance utility is started, it will sleep for one hour before it checks to see if there is any code to launch. Afterwards, it will check once every hour to see if the conditions are right to launch the given code.

FIG. 1 illustrates the high level processing logic for the workstation maintenance utility component in the exemplary embodiment. Processing begins as indicated in logic block 100 with the workstation start up. The workstation maintenance utility process goes to "sleep" for one hour and then wakes up as indicated in logic block 102. In decision block 104, the workstation maintenance utility determines if there is anything to do. If there is no process to run, the workstation maintenance utility returns to logic block 102 and goes back to sleep for another hour. If it determines there is a process to run, a determination is made as to whether or not to run the process immediately as indicated in logic block 106. The workstation maintenance utility can go back to sleep for an additional period of time (logic block 108) or run the process immediately (logic block 110). When the process completes as indicated in logic block 112, the workstation maintenance utility returns to logic block 102 to wait for the next cycle to begin. It should be noted that once the workstation starts up, the workstation maintenance utility runs continuously.

To launch a particular maintenance procedure the following steps are required: (1) place the executable code in a directory accessible by the workstation; (2) under the registry key, "HKLM\SOFTWARE\Energy Company\WebIcons\Maint\", create a sub-key with a unique name for the code to be launched; and (3) under the new sub-key, create the set of values from the table below which will cause the code to launch at the specified time.

TABLE

SleepMethod:
0 = Launch after the first hour of bootup and every hour afterwards at the same minute.
1 = Launch after every specified amount of wait time, specified in milliseconds.
2 = Launch on every occasion of a specified day of the week and local time zone hour.
3 = Launch only on a specified date and local time zone hour.
4 = Launch every day during a specified local time zone hour.
Exec: String Value with the name of the executable code including the path, e.g., c:\EnergyCo\Webicons\UpTime.exe.
Param: String Value can either be blank or contain the parameters to pass to the executable code.
Iterative:
0 = Code will not run if it is still in memory.
1 = Code will run again even if it is still in memory.

If the Sleep Method value is zero, no other values are required. If the Sleep Method value is one, the user must specify the amount of time in milliseconds to wait before launching the code. The specified time does not begin until one hour after bootup or service start.

When the Sleep Method value is one, the workstation maintenance utility will launch a thread after the first hour which will then go to sleep for the specified amount of time. After the specified amount of time has passed, the thread will then launch the code specified by "Path" and "Exec". When the thread is launched, a flag value in the created application key is set to one to keep the thread from being launched again. After the code is launched, the flag is set to zero. If the computer is rebooted before the specified sleep time has ended, the flag value is automatically reset to zero and the thread will be launched again after an hour has passed.

If the Sleep Method value is two, the user must enter a numeric value representing the day of the week, and a numeric value representing the hour of the day that the code should be launched. The code will be launched every time this day is reached at the hour specified. The code will not launch if an hour is not specified. The range of values for day of the week are zero (Sunday) though six (Saturday). The hour of the day is a numeric value representing the hour to launch the code. The range of values is 0-23. The hour refers to the local time zone.

If the Sleep Method value is three, then the user must enter a month, day, year and hour of the day for the code to be launched. The month is expressed as a numeric value representing the month in which the code should be launched. The range of values is 1-12. The day is a numeric value representing a date that exists within that month. The range of day values is 1-31, but if 31 does not exist in the given month, the code will not be launched. The year is a numeric value representing the year that the code should be launched. The year value will be a four digit number such as 2001. The hour is a numeric value representing the hour to launch the code. The range of values is 1-24. The hour refers to the local time zone.

If the Sleep Method value is four, the user must enter a numeric value representing the hour to launch the code. The range of values is 1-24. The hour refers to the local time zone.

When Sleep Method 2, 3 or 4 is used, the workstation maintenance utility will begin checking after the first hour and continue checking every hour for the correct time specified. The code will usually not launch exactly at the specified hour, but instead within an hour after the specified time has passed. This is based upon what time the workstation was brought up and the service was started. In other words, if the computer is brought up at 8:04 AM and the Sleep Method is 2 for Sunday at 10:00 PM (or 22 as specified in the 'Hour' value), the code will more than likely launch on Sunday at 10:04 PM.

If the registry value for "Debug" is set to one under "HKLM\SOFTWARE\Energy Company\WinMaint\", this setting will cause the workstation maintenance utility service to detail an activity log file under c:\energyco\logs called WinMaint.log. It is best to use the debug feature only for a short period during troubleshooting since the log file will otherwise continue to grow. It is also a good idea to delete the file when troubleshooting has been completed so that the next time it is needed it starts fresh. To change the debug value, it is necessary to stop and start the service. After setting the debug value for troubleshooting purposes, the debug feature may be turned off by setting the value to zero and stopping and starting the service. All other registry settings can be made without stopping and starting the service. The service will simply re-check the settings each hour.

Workstation Uptime Utility

The workstation uptime utility is installed using a standard installation program such as Microsoft Windows Installer for workstations operating on the Microsoft Windows platform. While it has the ability to run in a stand-alone mode, it is best operated as part of the workstation maintenance utility. The workstation uptime utility is a command-line driven utility which pops up Windows-based messages according to how long the computer has been operating since the last reboot. With proper configuration, the workstation uptime utility will prompt a user to reboot their workstation on a regular basis. Then if the user fails to reboot the workstation after a certain period of time, the workstation uptime utility will automatically reboot the workstation. It will do so with plenty of warning to the user, even giving a configurable countdown to the user before it performs the reboot.

The workstation uptime utility also includes a built-in exception capability. This allows certain workstations operating sensitive programs to be exempted from automatic reboot by being in a global workstation network group. Exempted workstations will not receive any prompts from the workstation maintenance utility for reboot, but central logs will still be maintained as to individual workstation uptime. The command line format for the workstation uptime utility in a Windows-operating environment is as follows:

usage: winuptime [-?]|[-e]|[-l]|[-p #]|[-f # #[#][#]]|[-o # #[#] [#]]

where:
- no parameter simply displays the uptime;
- -? displays this message;
- -e displays exception information;
- -l outputs to a log file on \\logs.energyco.com\logs$\UpTime and c:\EnergyCo\Logs;
- -p if # days or more, displays a popup giving the user an opportunity to reboot;
- -f first # prompts as above after specified days; after second # forces reboot; if 0 or # days or more, displays a popup giving the user an opportunity to reboot immediately; otherwise the workstation will reboot automatically in one hour; the 3rd # is for an optional offset for running under a service; the 4th # is for an optional # seconds which the force will wait for the reboot; the default time, if this is not used, is 60 minutes;
- -o works exactly like the -f except that it overrides the exception process.

Figure 2A:
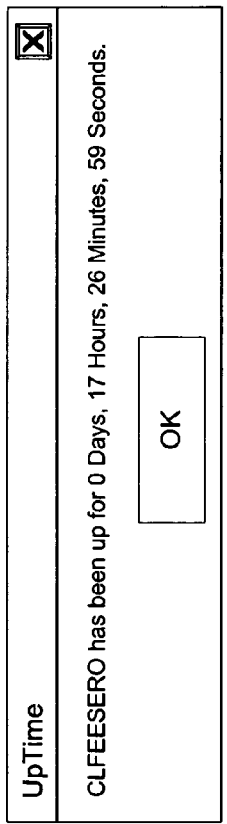
Figure 2B:
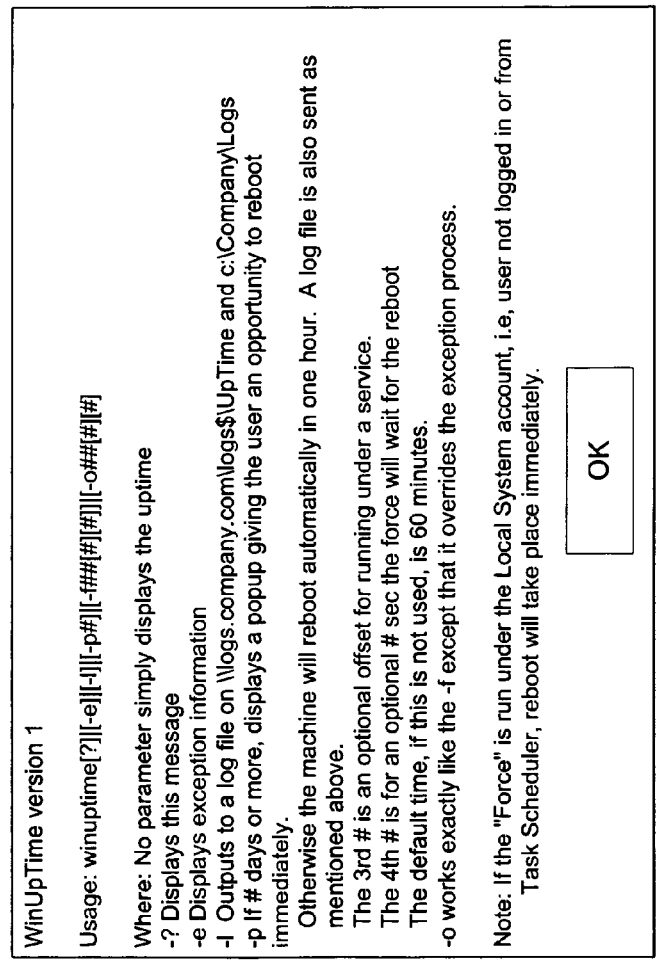
Figure 2E:
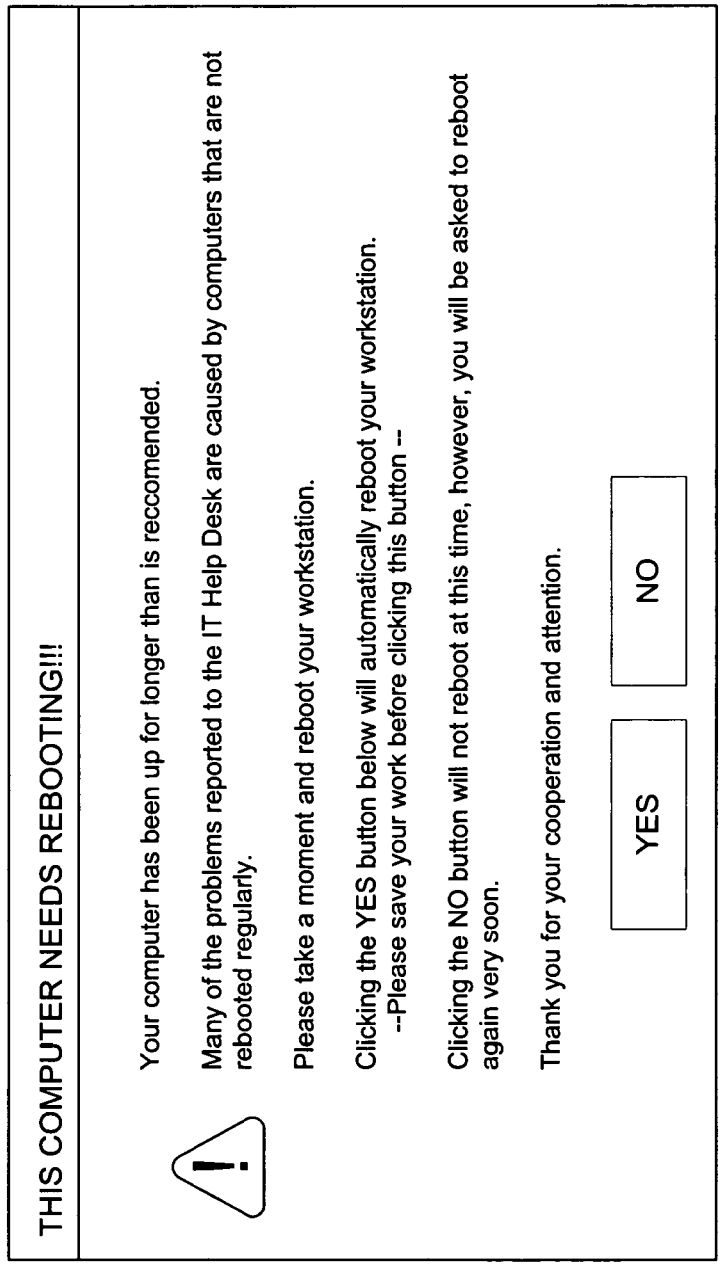

FIGS. 2A-2E illustrate various exemplary screen displays generated by the workstation uptime utility. FIG. 2A provides an example of a message received from running the workstation uptime utility with no parameters. FIG. 2B illustrates an example message received when running the workstation uptime utility with the "-?" parameter. It basically provides a help screen for the workstation uptime utility. FIG. 2C illustrates an example message received when running the workstation uptime utility with the "-e" exception parameter. If the workstation is in the global exception group, it will not go through a forced reboot. FIG. 2D illustrates an example message received when running the workstation uptime utility with the "-f" parameter using the prompt and force parameters. FIG. 2E illustrates an example message received when running the workstation uptime utility with the "-p" parameter and the number of days to prompt.

The following is a list of the different log types:
_MachineName_UpTime.log
nr_MachineName_UpTime.log
r_MachineName_UpTime.log
f_MachineName_UpTime.log
ex_MachineName_UpTime.log
fex_MachineName_UpTime.log The log file created by the workstation uptime utility will vary according to the type of argument passed. The log file arguments are as follows:
- -l log file will be named # MachineName_UpTime.log, where # is the number of days the workstation has been up;
- -p if the user responds with "yes" the log file will be named r_MachineName_UpTime.log; if the user responds with "no" the log file will be named nr_MachineName_UpTime.log;
- -f for the prompt period, the log names will be the same as for the -p argument; for the force, the log file will be named f_MachineName_UpTime.log unless the workstation is in the exception global group; if the workstation is in the exception global group, the log file will be named ex_MachineName_Uptime.log for the prompt period; although the user will not receive a prompt, the log will still be created;
- for workstations in the exception group, during the force period, a log file will be created named fex_MachineName_UpTime; although the user will not be prompted and the workstation will not be rebooted, the log will still be created; every log created will have the amount of time the workstation has been up, the workstation name and the user name; every log will also state whether the user elected to reboot when prompted.

The logic for logging will vary according to the argument as follows:
- -l the logging concept is that the workstation uptime executable can be run on many workstations to collect uptime statistics; the central log server collects a log from each workstation on which the workstation uptime utility is run; the folder where the files accumulate can then be sorted by the number of days of uptime and then the workstation name; such a collection will show at a glance which workstations are problems;
- -p the collection of log files can be sorted to show all workstations for which the user has either declined reboot or accepted reboot; there will be many cases in which the workstation will be in both groups with different dates;
- -f the prompt period will work exactly like the -p; the force will be sorted together by workstation name; the exception workstations will also be sorted together.

Workstation Maintenance Service Editor

Figure 4:
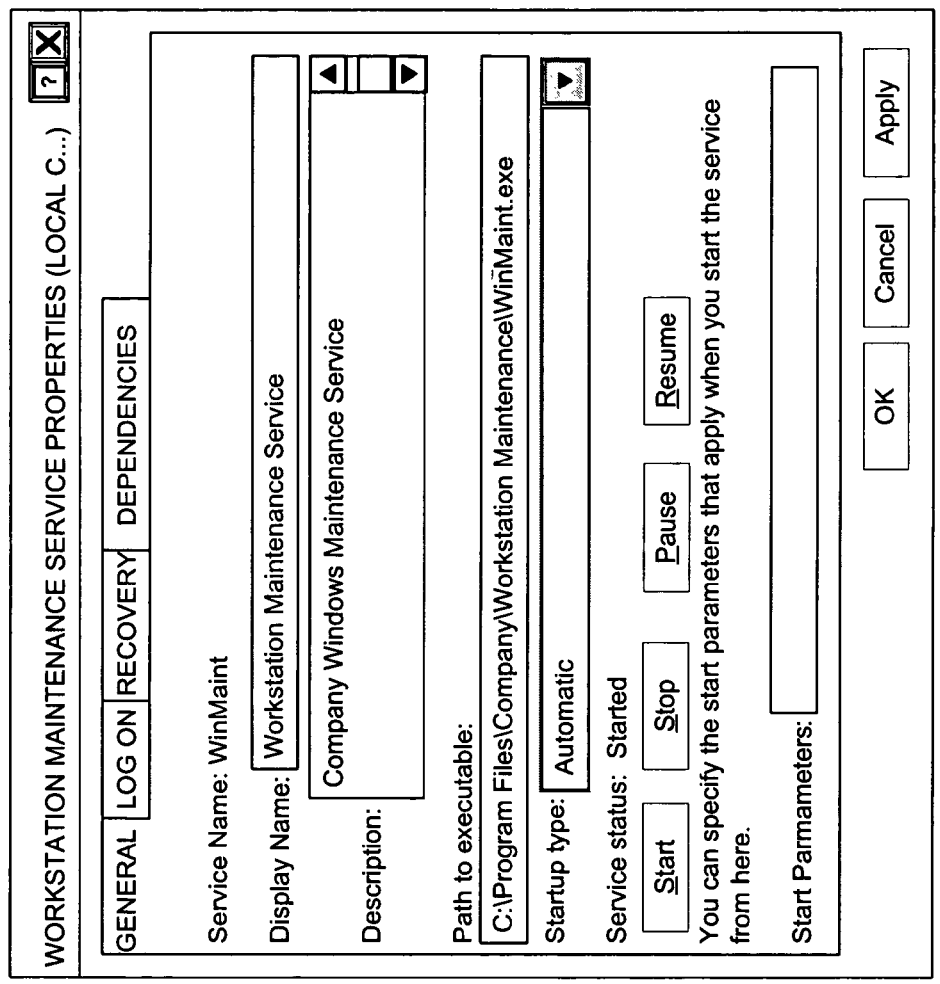
FIG. 4 illustrates an exemplary workstation maintenance utility service properties display.
Figure 5:
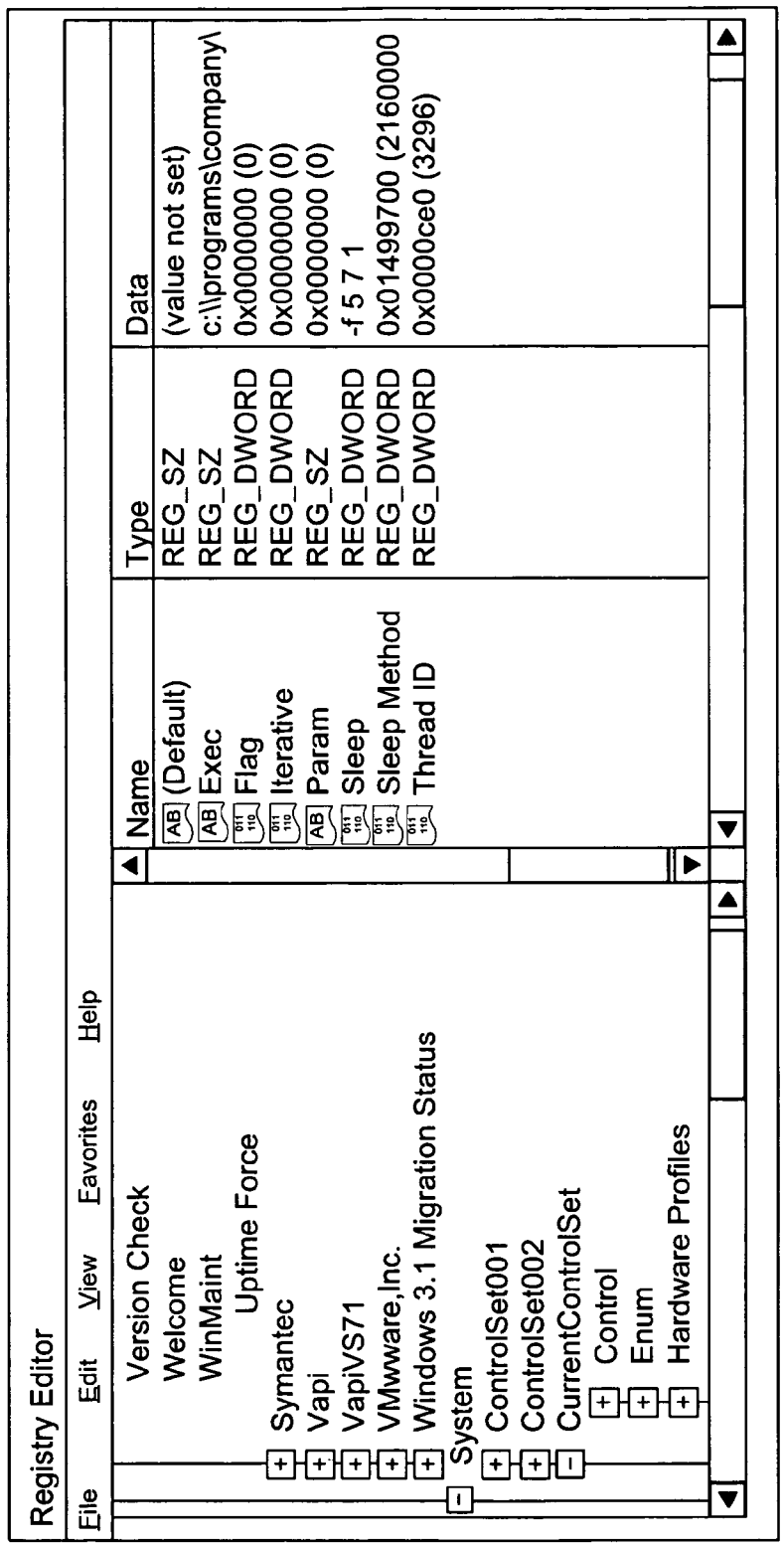
FIG. 5 illustrates an exemplary workstation platform registry editor.

FIG. 3 illustrates an exemplary Service Control Manager view with the workstation maintenance utility service selected. FIG. 4 illustrates an exemplary workstation maintenance utility service properties editor display. This figure shows the service name, description, path to executable, startup type, and service status. FIG. 5 illustrates an exemplary workstation platform registry editor. The workstation maintenance utility is configured using the registry editor. This figure shows one application ("Uptime Force") configured to be run by the workstation maintenance utility. Other applications would simply follow the "Uptime Force" under the "WinMaint" key.

Figure 6:
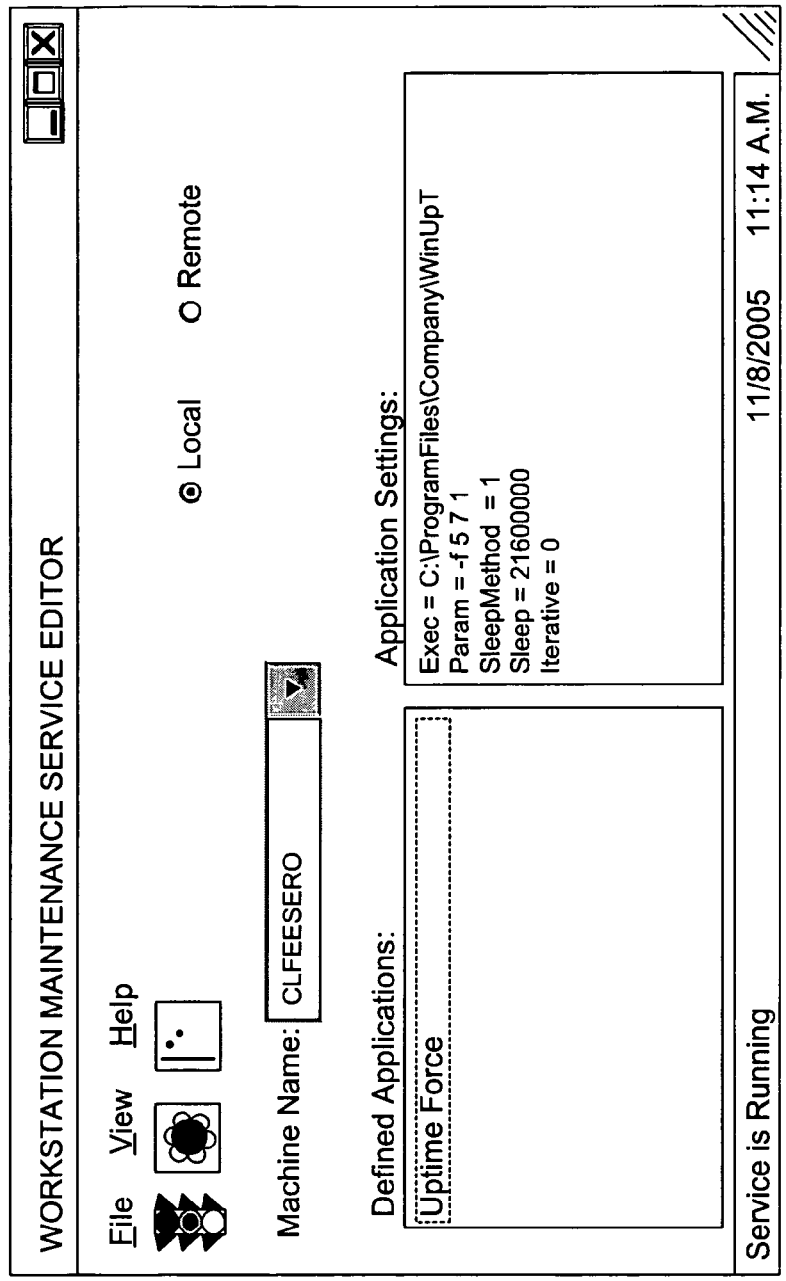
FIG. 6 illustrates an exemplary workstation maintenance utility service editor display for local mode operation.

FIG. 6 illustrates an exemplary workstation maintenance utility service editor display for local mode operation. The workstation maintenance utility service editor is a graphical user interface (GUI) tool which was written for the purpose of managing the workstation maintenance utility on many workstations remotely. It is a simple executable written in Visual Basic 6.0 which can be run from any workstation on the network and connect to any other workstation on the network.

When the workstation maintenance utility service editor ("WinMaintEditor") first comes up, it is in local mode, meaning that it will look at the local workstation to see if the workstation maintenance utility (WinMaint) is installed. If the workstation maintenance utility is installed, it will report on the status of the service and what applications are installed as part of the service, plus their configuration. In the example above, the workstation uptime utility ("WinUpTime") is configured as "UpTime Force" on the local workstation, as shown in the "Defined Applications" window of the form. Under "Application Settings" is shown how the "UpTime Force" application is configured to be launched by the workstation maintenance utility.

In the upper left hand corner of the service editor display is a traffic light icon which is used to turn on and off the ability to stop and start the workstation maintenance utility. Clicking the traffic light will cause it to turn green. The lower left hand part of the service editor display has a status bar which gives the status of the service. In the example illustrated in FIG. 6, the service is running. By clicking the icon next to the traffic light (with the circle in the center), the user can stop the service as long as the traffic light is green. Clicking the icon with the arrow in the center will cause the service to start again. Then clicking the traffic light will cause it to turn red, locking the service control feature.

Figure 7:
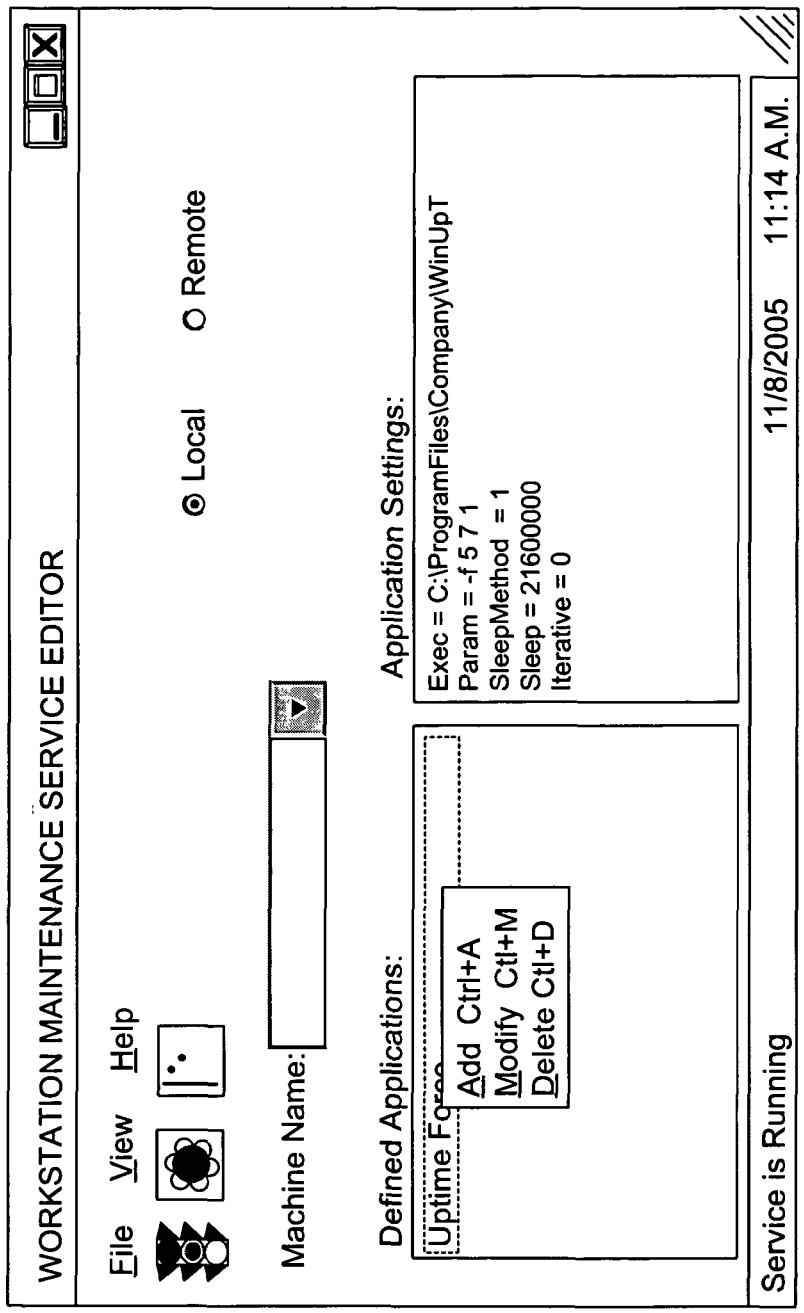
FIG. 7 illustrates an exemplary popup menu for editing a workstation maintenance utility application.

To modify an application in the workstation maintenance utility, the user simply clicks the name of the application to be changed and then right clicks on the application name. This will cause a small popup menu to appear, as illustrated in FIG. 7, enabling the user to add, modify, or delete the application. Selecting "Add" on the popup menu will give the user the opportunity to add an application to the functionality of the workstation maintenance utility. Selecting "Modify" or "Delete" will directly affect the application selected. Selecting "Delete" will remove the application from the workstation maintenance utility service. Selecting "Add" or "Modify" will bring up windows that allow the user to configure an application. Selecting "Add" will be for a new application; selecting "Modify" will bring up the current configuration of the selected application so that changes can be made.

Figure 8:
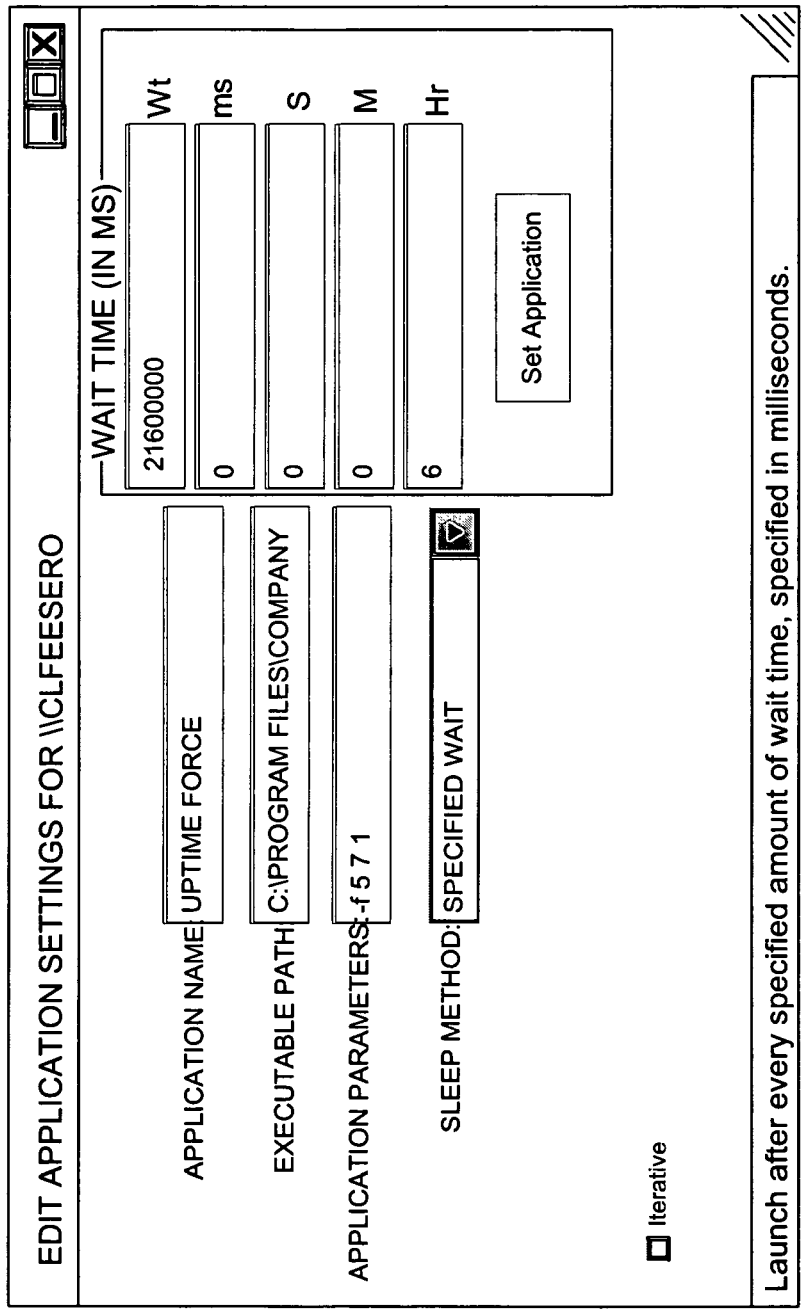
FIG. 8 illustrates an exemplary add/modify form for a workstation maintenance utility application.

FIG. 8 illustrates an exemplary add/modify form for a workstation maintenance utility application. This display helps to make sense of what otherwise could be construed as cryptic parameters required for setting up the workstation maintenance utility. The "Application Name", "Executable Path" and "Application Parameters" fields are self-explanatory. "Application Name" is the name which is shown in the "Defined Applications" window and in the logs from Win-Maint. "Executable Path" is the complete path to the executable file which the workstation maintenance utility is to launch. The "Application Parameters" settings provide the arguments that the workstation maintenance utility should pass to the application when it is launched. The "Sleep Method" is used to specify when a maintenance procedure should launch after a workstation is started.

Figure 9:
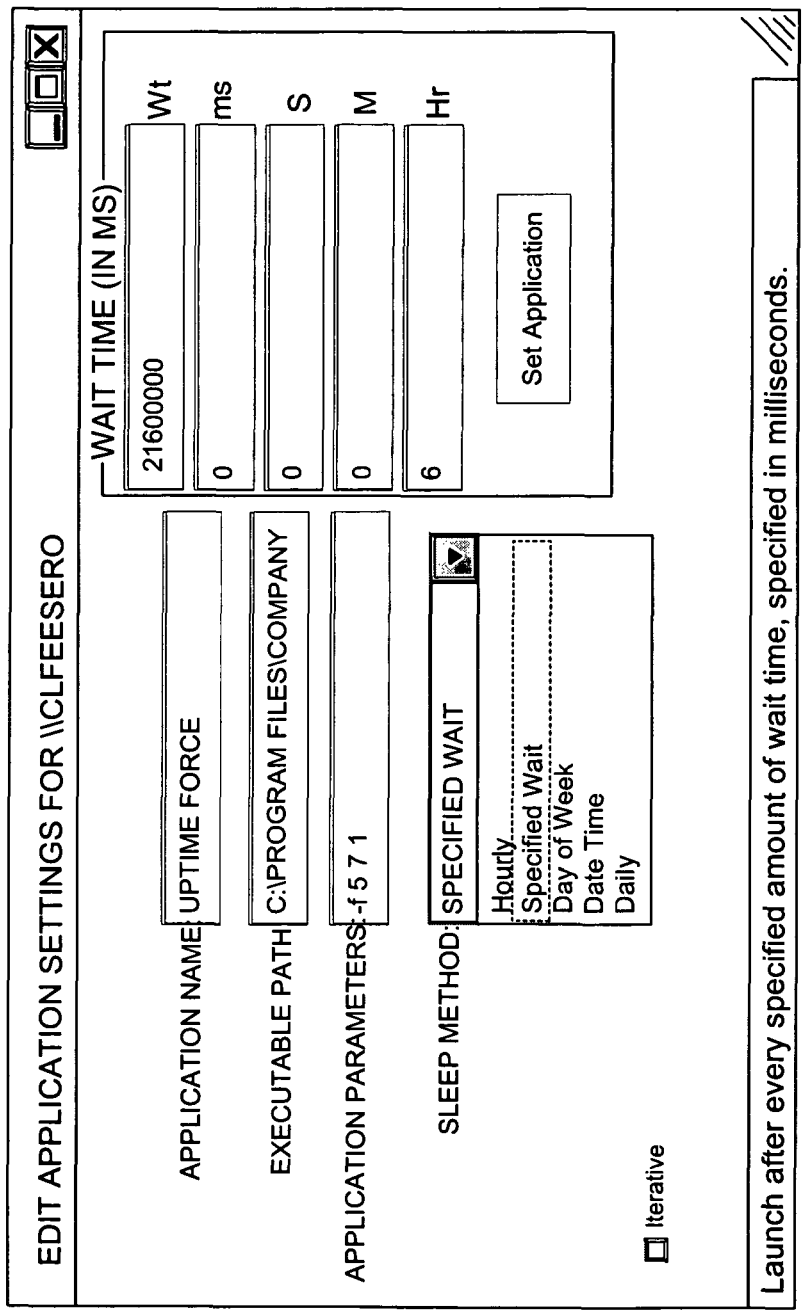
FIG. 9 illustrates an exemplary display for editing a workstation maintenance utility application.

FIG. 9 illustrates an exemplary display for editing a workstation maintenance utility application. With the use of the drop down menu for "Sleep Method", it is readily apparent that the exemplary embodiment has five different possibilities. Each selection will alter the form to reflect the configuration methods. As shown in FIG. 9, the form shows the setup for "Specified Wait" method of sleep and the status bar at the bottom of the form gives more information about how the "Sleep Method" is used.

Using "Specified Wait", the form offers a time calculator on the right hand side. "Specified Wait" is measured in milliseconds. By specifying the hours, minutes and seconds of wait time, the calculator determines the specified amount of time in milliseconds. In the example shown in FIG. 9, the system checks the workstation every six hours, or equivalently, 21,600,000 ms. The workstation maintenance utility editor allows the user to enter an amount of time in hours, minutes, seconds and milliseconds which will automatically be calculated into milliseconds with the number placed in the "Wt" or wait field at the top. Every number that the user inputs adds the appropriate number of milliseconds to the "Wt" field at the top. After the user finishes configuration, the user can select "Set Application." This causes the user-defined configuration to be written to the registry for the workstation maintenance utility to pick up at its next cycle.

The "Hourly" sleep method is the simplest to configure. The service will run the application every hour that it wakes up to discover if it has anything to do. Day of the week selection for sleep method is made simple by providing the drop down boxes of days and hours which can be configured. Date and time selection for sleep method provides a drop down for the months, the day, the year (up to five years in the future), and the time. Launching daily at a specified time is also configured using the drop down selection for the time of day.

The "Iterative" checkbox is generally not used. However, its function can be appropriate under certain circumstances. With the "Iterative" box checked, the workstation maintenance utility will launch another iteration of the application even if one thread is already waiting for its time to come up. In other words, with the application set to launch after a specified wait of six hours, after the first hour that the service starts it will launch a thread which will go to sleep for six hours before it wakes up and runs. With "Iterative" checked, this same thread will be set every hour. This means that at the end of the first six hour wait, the application will run every hour.

Figure 10:
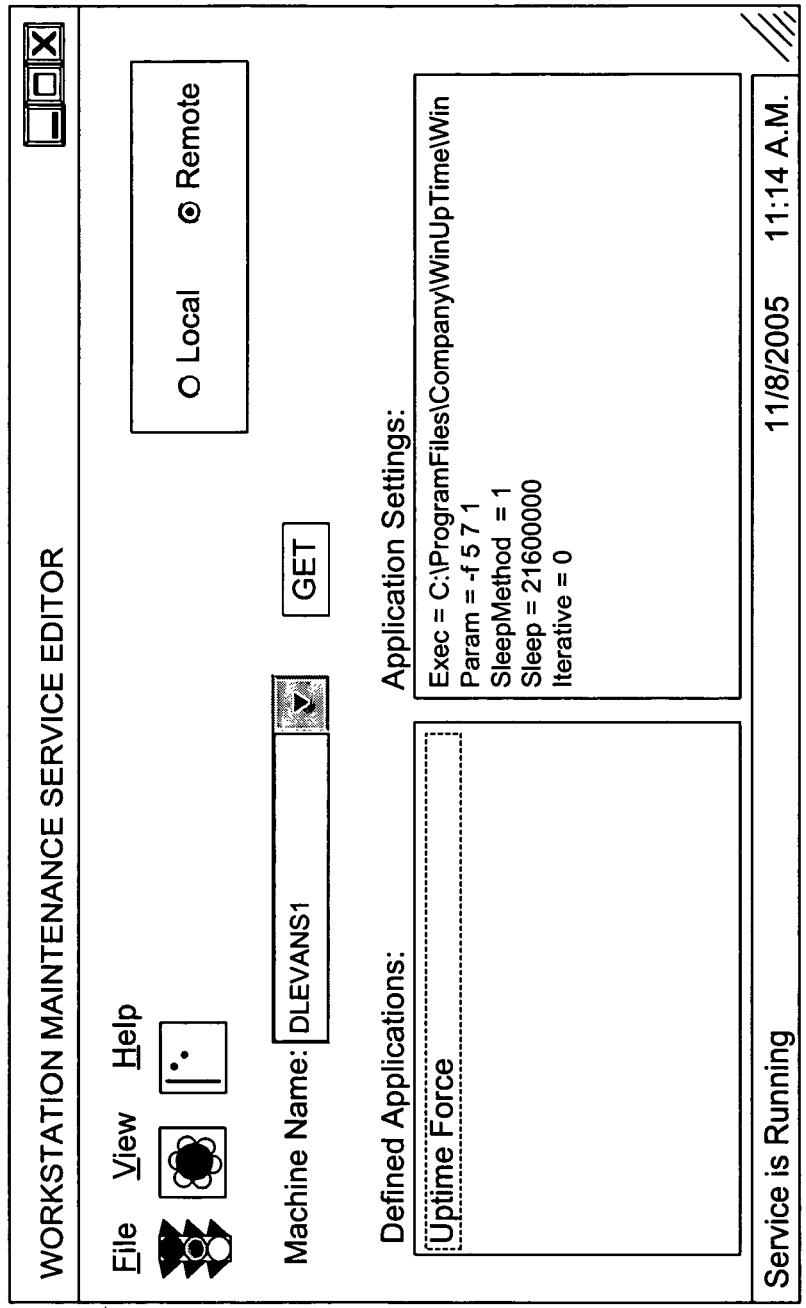
FIG. 10 illustrates an exemplary workstation maintenance utility service editor display for remote workstation access.

FIG. 10 illustrates an exemplary workstation maintenance utility service editor display for remote workstation access. On the right hand side of the form are two radio buttons which are used to toggle between "Local" mode and "Remote" mode. When the workstation maintenance utility editor comes up, it defaults to "Local" mode. To switch to "Remote" mode, the user simply selects the "Remote" radio button, then types in the computer name in the "Machine Name" field on the left hand side of the display and clicks the "Get" button. This will contact the remote workstation and display its configuration information the same as it does for local mode. Functionality is the same in remote mode, including the ability to stop and start the service.

Figure 11:
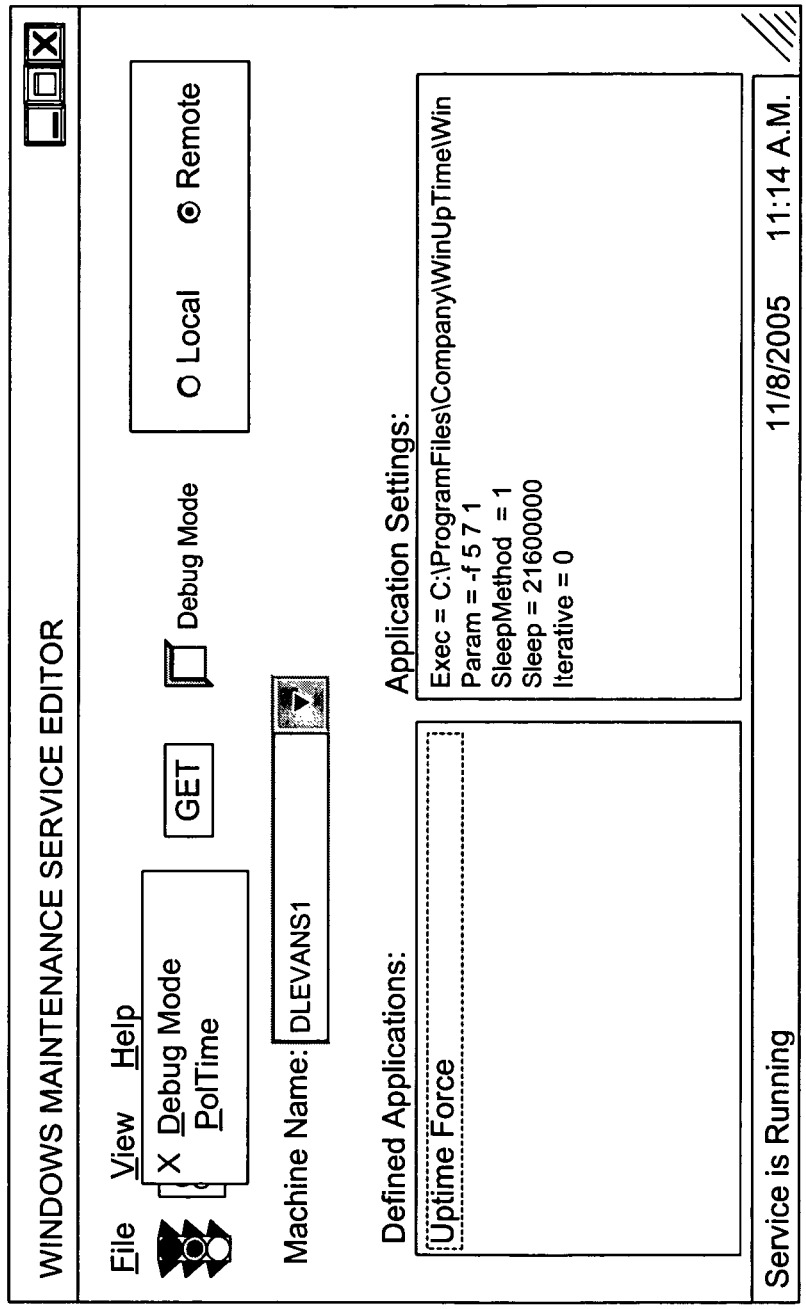
FIG. 11 illustrates an exemplary workstation maintenance utility service editor display for debug mode operation.

FIG. 11 illustrates an exemplary workstation maintenance utility service editor display for debug mode operation. In debug mode, the workstation maintenance utility will write a continuous debug log during its operation. Since this log can fill up quickly, it is usually not used unless there is a problem and troubleshooting methods are needed. The user can turn this feature on by going to the "View" menu at the top of the form and selecting "Debug Mode". This allows the "Debug Mode" checkbox to show up on the form. The user can then check "Debug Mode" to turn it on or uncheck it to turn it off. Likewise to remove the "Debug Mode" checkbox from the form, the user can simply reselect "Debug Mode" from the "View" menu causing it to disappear from the form.

Figure 12A:
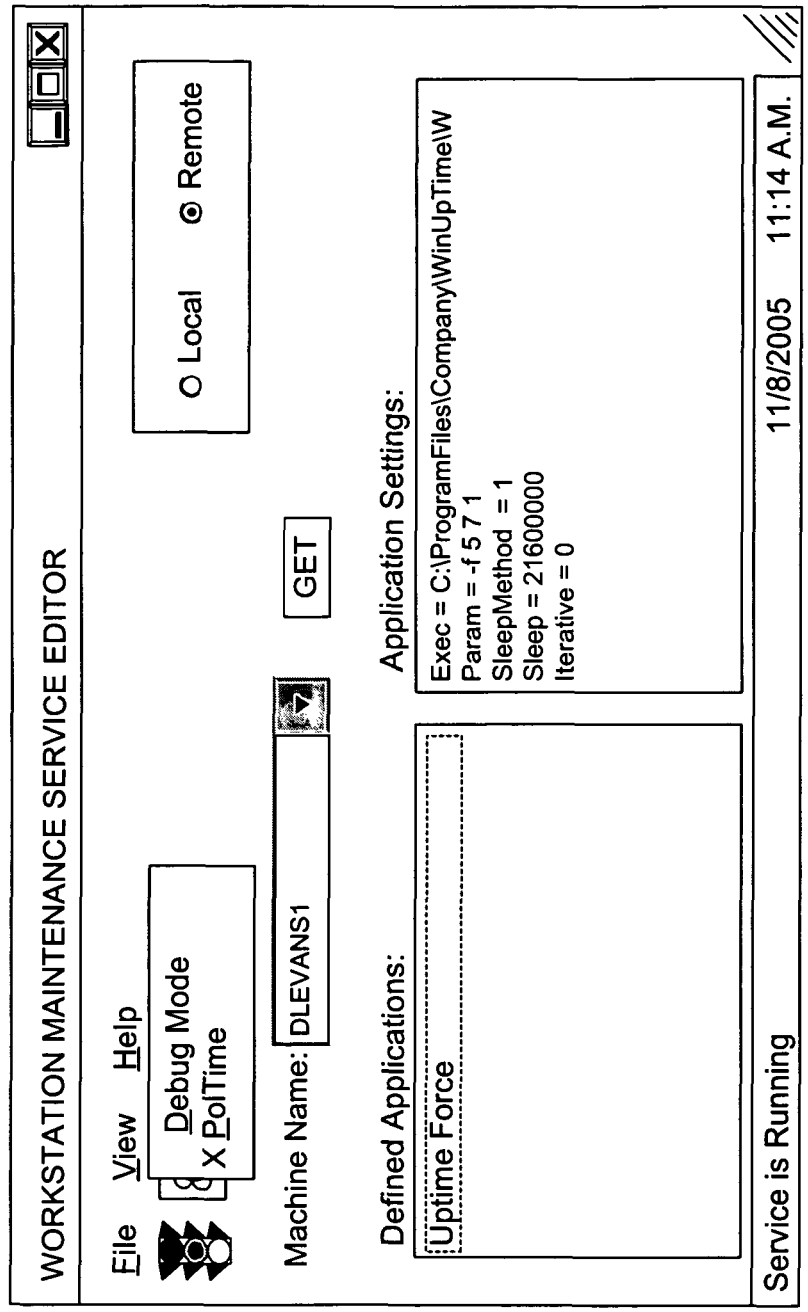
FIGS. 12 A-12B illustrate an exemplary workstation maintenance utility service editor display for poll time operation.
Figure 12B:
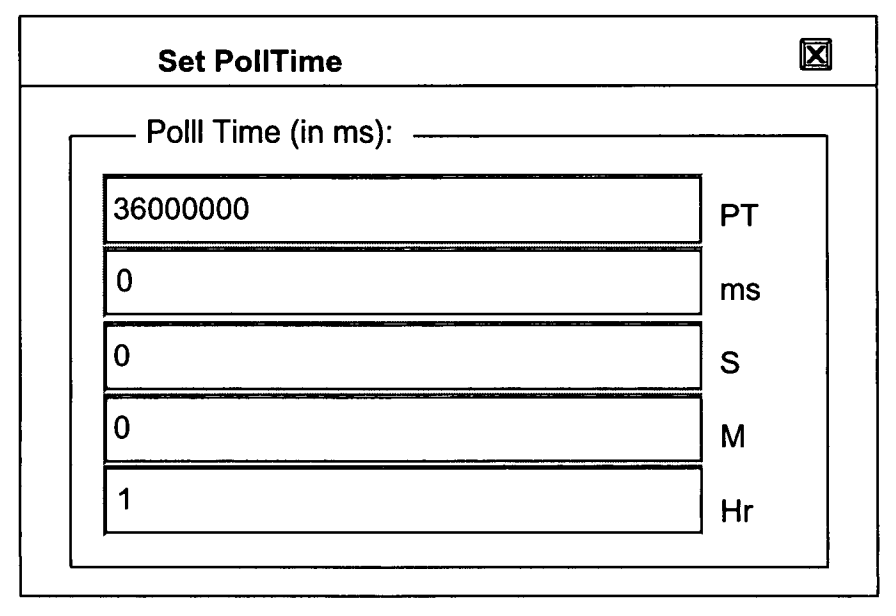

By default, the workstation maintenance utility is set to wake up every hour to check and see if it has anything to do. This option can actually be adjusted to be any other time using the poll time feature. FIGS. 12 A-12B illustrate exemplary workstation maintenance utility service editor displays for poll time operation. To use this feature, the user goes to the "View" menu shown in FIG. 12A and selects "PollTime". This will cause the "PollTime" calculator form shown in FIG. 12B to pop up. It should be noted that this calculator is very similar to the "Specified Wait" time calculator used to set up the sleep mode for the application. Since poll time needs to be configured in milliseconds, this calculator allows the user to enter a time, e.g., 1 hour, and the amount of time in milliseconds is automatically displayed in the "PT" field at the top.

The present invention can be utilized for monitoring system uptime on large number of networked workstations for reasons other than rebooting for virus protection and regular maintenance. The invention can be used to trigger maintenance type jobs on a managed schedule. The invention can also be used to manage automatic rebooting on a large number of workstations for other reasons.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method, comprising:
    configuring a maintenance service utility to launch a maintenance procedure at a specified time during operation of a computer system comprising a workstation;
    activating operation of a maintenance timer utility to track an amount of time that the computer system has been operating since startup;
    determining whether there are any updates to an executable programming code that require installation;
    in response to the determining, selecting an iterative mode for the maintenance service utility, which enables the maintenance service utility to awake periodically following a predefined period of time to determine whether there is a new maintenance procedure to launch;
    creating a sub-key in a computer system registry key having a unique name for an executable code to launch;
    launching the maintenance procedure, via a thread, after the predefined period of time when there are updates to the executable programming code by launching an update executable code comprising the updates to be installed to the executable programming code;
    launching another iteration of the maintenance service utility, via the same thread, to update the executable programming code that is set to launch upon expiration of a different predefined period of time which is shorter than the predefined period of time associated with the maintenance service utility;
    identifying the workstation as part of a global exception group that prevents an automatic reboot of the identified workstation; and
    maintaining logs of the workstation when the workstation is identified as part of the global exception group;
    wherein the launching of the maintenance service utility comprises launching an active thread which invokes a flag value being set to keep the active thread from being launched again.

2. The method of claim 1, wherein the configuring of the maintenance service utility to launch a maintenance procedure comprises selecting sleep mode for the maintenance service utility.

3. The method of claim 2, wherein the sleep mode is selected from a list comprising hourly, a specified wait, a day of week, a date time, and daily.

4. The method of claim 1, further comprising selecting a wait time for the maintenance service utility to remain dormant.

5. The method of claim 1, wherein the configuring of the maintenance service utility is performed at least one of locally on the computer system and remotely from another computer system.

6. The method of claim 1, wherein the maintenance timer utility reboots the computer system when the amount of time the computer system has been operating since startup exceeds a predetermined threshold limit.

7. The method of claim 1, further comprising displaying a message to a user requesting reboot of the computer system.

8. The method of claim 1, further comprising:
    causing the maintenance service utility to go to sleep for the predetermined period of time; and
    causing the maintenance service utility to wake up after a predetermined period of time has elapsed.

9. The method of claim 1, further comprising determining whether the computer system is operating on the workstation that is part of the global exception group.

10. The method of claim 1, wherein the activating of the operation of the maintenance timer utility occurs during startup of the computer system.

11. The method of claim 1, wherein the created set of values comprises a sleep mode value, a unique executable code name, and a path to the executable code to launch.

12. The method of claim 11, wherein the sleep mode value is a numeric value that corresponds to a sleep mode selected from a list comprising hourly, a specified wait, a day of week, a date time, and daily.

13. The method of claim 11, wherein the created set of values further comprises at least one parameter to pass to the executable code to launch.

14. A non-transitory computer readable medium comprising computer readable code stored therein, the computer readable code, when executed by at least one processor, configured to cause the at least one processor to:
    configure a maintenance service utility to launch a maintenance procedure at a specified time during operation of a computer system comprising a workstation;
    activate operation of a maintenance timer utility to track an amount of time that the computer system has been operating since startup;
    determine whether there are any updates to an executable programming code that require installation;
    in response to the determine, select an iterative mode for the maintenance service utility, which enables the maintenance service utility to awake periodically following a predefined period of time to determine whether there is a new maintenance procedure to launch;

create a sub-key in a computer system registry key having a unique name for the executable programming code to launch;

launch the maintenance procedure, via a thread, after the predefined period of time when there are updates to the executable programming code, the maintenance procedure configured to launch an update executable code comprising the updates to be installed to the executable programming code;

launch another iteration of the maintenance service utility, via the same thread, to update the executable programming code that is set to launch upon expiration of a different predefined period of time which is shorter than the predefined period of time associated with the maintenance service utility;

identify the workstation as part of a global exception group that prevents an automatic reboot of the identified workstation; and maintain logs of the workstation when the workstation is identified as part of the global exception group;

wherein the maintenance service utility being launched comprises the launch of an active thread which invokes a flag value being set to keep the active thread from being launched again.

15. The non-transitory computer readable medium of claim 14, wherein the updated executable code is further configured to cause the at least one processor to configure the maintenance service utility to launch a maintenance procedure that enables selecting a sleep mode for the maintenance service utility.

16. The non-transitory computer readable medium of claim 15, wherein the sleep mode is selected from a list comprising hourly, a specified wait, a day of week, a date time, and daily.

17. The non-transitory computer readable medium of claim 14, wherein the update executable code is further configured to cause the at least one processor to enable selecting of a wait time for the maintenance service utility to remain dormant.

18. The non-transitory computer readable medium of claim 14, wherein the maintenance service utility is executed at least one of locally on the computer system and remotely from another computer system.

19. The non-transitory computer readable medium of claim 14, wherein the maintenance timer utility reboots the computer system when the amount of time the computer system has been operating since startup exceeds a predetermined threshold limit.

20. The non-transitory computer readable medium of claim 14, wherein the computer program code is further configured to cause the at least one processor to display a message to a user requesting reboot of the computer system.

21. The non-transitory computer readable medium of claim 14, wherein the computer program code is further configured to:
cause the maintenance service utility to go to sleep for the predetermined period of time; and
cause the maintenance service utility to wake up after a predetermined period of time has elapsed.

22. The non-transitory computer readable medium of claim 14, wherein the computer program code is further configured to determine whether the at least one computer system is operating on the workstation that is part of the global exception group.

23. The non-transitory computer readable medium of claim 14, wherein the activating of the operation of the maintenance timer utility occurs during startup of the computer system.

24. The non-transitory computer readable medium of claim 14, wherein the created set of values comprises a sleep mode value, a unique executable code name, and a path to the executable code to launch.

25. The non-transitory computer readable medium of claim 24, wherein the sleep mode value is a numeric value that corresponds to a sleep mode selected from a list comprising hourly, a specified wait, a day of week, a date time, and daily.

26. The non-transitory computer readable medium of claim 24, wherein the created set of values further comprises at least one parameter to pass to the executable code to launch.

* * * * *